UNITED STATES PATENT OFFICE.

FRANZ A. RODY, OF JOHNSON CITY, TENNESSEE, ASSIGNOR TO METALLURGICAL COMPANY OF AMERICA, OF NEW YORK, N. Y., A CORPORATION OF NEW JERSEY.

METHOD OF OBTAINING ALKALIS AND ALUMINA FROM SILICATES CONTAINING THEM.

1,263,705.     Specification of Letters Patent.     Patented Apr. 23, 1918.

No Drawing. Application filed May 18, 1915, Serial No. 28,893. Renewed July 13, 1917. Serial No. 180,483.

*To all whom it may concern:*

Be it known that I, FRANZ A. RODY, a subject of the Emperor of Germany, residing at Johnson City, Tennessee, have invented certain new and useful Improvements in Methods of Obtaining Alkalis and Alumina from Silicates Containing Them; and I do hereby declare the following to be a full, clear, and exact description of the invention, such as will enable others skilled in the art to which it appertains to make and use the same.

In an application for Letters Patent of the United States, Serial No. 794,598, filed October 11, 1913, which has matured into Patent No. 1,151,533, dated August 24, 1915, I have described an improved method of obtaining alkalis and alumina from silicates containing them, in which I treat a mixture of the silicate, and an oxid of an alkaline-earth metal or its equivalent at a sintering heat, and digest the ground clinker thus obtained with water, thereby extracting the alkalis and alumina as alkali aluminate. In my application Serial No. 28,891, filed May 18, 1915, I have described the production of the clinker, by the further addition of alkali carbonate to the mixture from which it is produced.

The solution thus obtained is at most a dilute one. In order to recover the alkalis from the solution, after the alumina is precipitated, a large quantity of water must be evaporated.

I have now discovered that it is possible to use the above filtrate for digesting purposes with new batches of clinker and without any apparent loss of alkali and alumina. I may repeat this operation until the liquor becomes strong enough for other treatment, whereupon a portion is withdrawn for this purpose. An equal quantity of wash water is then substituted and another digestion is made. A similar quantity of strong solution is then withdrawn for further treatment and replaced by an equal quantity of wash water, and the procedure is continued. As the solution becomes stronger, the extraction is found to increase slightly, which may be due to the more concentrated lixiviant employed.

The advantage of the improved process consists in the fact that for obtaining the alkali, it is not necessary to incorporate so much water and also that, as noted, there is a small but important increase in the amount of valuable material obtained from the rock.

What I claim is:

1. The method of recovering alkalis and alumina from feldspar, leucite and like silicates containing them, which comprises heating to a sintering temperature a mixture containing a silicate and an alkaline-earth metal oxid and digesting the clinker with a dilute solution of alkali aluminate, thereby enriching the solution by the alkalis and alumina contained in the sinter; substantially as described.

2. The method of recovering alkalis and alumina from feldspar, leucite and like silicates containing them, which comprises heating to a sintering temperature a mixture containing a silicate, and an alkaline-earth metal oxid, boiling with water to dissolve out the alkali and alumina, digesting a like sintered mixture with the dilute solution of alkali aluminate thus obtained, and so on, and withdrawing from time to time a portion of the enriched solution while supplying its place by a like portion of the dilute solution; substantially as described.

3. The method of recovering alkalis and alumina from feldspar, leucite and like silicates containing them, which comprises heating to a sintering temperature a mixture containing a silicate, an alkali and an alkaline-earth metal oxid and digesting the clinker with a dilute solution of alkali aluminate, thereby enriching the solution by the alkalis and alumina contained in the sinter; substantially as described.

4. The method of recovering alkalis and alumina from feldspar, leucite and like silicates containing them, which comprises heating to a sintering temperature a mixture containing a silicate, an alkali and an alkaline-earth metal oxid, boiling with water to dissolve out the alkali and alumina, digesting a like sintered mixture with the dilute solution of alkali aluminate thus obtained, and so on, and withdrawing from time to time a portion of the enriched solution while supplying its place by a like portion of the dilute solution; substantially as described.

In testimony whereof I affix my signature in presence of two witnesses.

FRANZ A. RODY.

Witnesses:
H. M. BURKEY,
JEROME S. KATZ.